(12) United States Patent
Choo

(10) Patent No.: US 6,471,263 B1
(45) Date of Patent: Oct. 29, 2002

(54) GLASS RELEASE BUTTON ASSEMBLY OF AUTOMOTIVE TAILGATE

(75) Inventor: Jin-Su Choo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 09/666,603

(22) Filed: Sep. 20, 2000

(30) Foreign Application Priority Data

Dec. 10, 1999 (KR) .............................................. 99-56530

(51) Int. Cl.[7] ................................................. E05B 3/00
(52) U.S. Cl. ............................. 292/336.3; 292/DIG. 37; 292/DIG. 29
(58) Field of Search ....................... 292/336.3, DIG. 37, 292/DIG. 29, DIG. 43; 296/146.8, 146.16

(56) References Cited

U.S. PATENT DOCUMENTS

| | | | | |
|---|---|---|---|---|
| 190,074 A | * | 4/1877 | Penfield ....................... | 292/175 |
| 3,604,230 A | * | 9/1971 | Tixier .......................... | 70/181 |
| 5,029,917 A | * | 7/1991 | Szerlag ........................ | 292/347 |
| 5,297,405 A | * | 3/1994 | Manning ...................... | 70/208 |
| 6,106,036 A | * | 8/2000 | Okada ....................... | 292/336.3 |
| 6,299,223 B1 | * | 10/2001 | Ji ................................ | 292/175 |

* cited by examiner

Primary Examiner—Gary Estremsky
(74) Attorney, Agent, or Firm—Birch, Stewart, Kolasch & Birch, LLP

(57) ABSTRACT

A tailgate glass release button assembly includes a button-mounting unit installed into a release button assembly hole formed on an outer panel of a tailgate for providing a socket, a button plugged into the socket of the button-mounting unit, and a spring interposed between the button-mounting unit and the button for returning the button after being depressed. The button-mounting unit has more than one hanger formed around an upper portion of the button-mounting unit for preventing the button-mounting unit from being separated before being fastened.

3 Claims, 5 Drawing Sheets

GLASS RELEASE BUTTON ASSEMBLY OF AUTOMOTIVE TAILGATE

BACKGROUND OF THE INVENTION (a) Field of the Invention

The present invention relates to an improved glass release button assembly of an automotive tailgate capable of enhancing operational stability and ease of assembly.

(b) Description of the Related Art

FIG. 1 shows a tailgate equipped with a conventional tailgate glass release button assembly. FIG. 2 is a side cross-sectional elevation view of the conventional tailgate glass release button assembly and FIG. 3 is a cross-sectional view cut along the line III—III of FIG. 1.

The tailgate glass release button assembly 2 comprises a mounting bay 16 installed in an outer panel 6 of the tailgate 4 so as to be inset into the outer panel, and a release button 12 mounted into the inset mounting bay 16.

The release button 12 has an inner space in which a spring 10 is installed such that one end of the spring 10 contacts the mounting bay 16 and the elastic force of the spring 10 returns the button 12 to it's outwardly extended position after it is depressed and released. Also, the release button 12 has a pair of pin slots (not shown) formed on two sidewalls facing each other, through which a pin 14 supported by the mounting bay 16 passes, so as to prevent the button 12 from being separated from the mounting bay 16.

The release button 12 has a push rod 24 extended from its open end such that when the release button 12 is depressed, the push rod 24 pushes one end of an opening lever 22. One end of the opening lever 22 is pivotally connected to a link assembly 44 which interacts with the opening lever 22 such that if the push rod 24 pushes up on one end of the opening lever, the other end where the link assembly 44 is connected is pulled down by a lever effect. This causes a latch 46 connected to the other end of the link assembly 44 to be pulled so as to release the glass 8 from the tailgate panel.

However, this conventional tailgate glass release button assembly has a drawback in that the button is unstable and it is difficult to assembly, especially when fastening nuts used to affix it to the tailgate.

SUMMARY OF THE INVENTION

The present invention has been made in an effort to solve the above problems of the prior art.

It is an object of the present invention to provide an improved tailgate glass release button assembly capable of reducing whole manufacturing costs by avoiding usage of the pin acting as a stopper of the release button and making the assembly process easy by facilitating a snap-in installation of the release button.

To achieve the above object, a tailgate glass release button assembly according to the present invention comprises a button-mounting unit installed into a release button assembly hole formed in an outer panel of a tailgate for providing a socket, a button plugged into the socket of the button-mounting unit, and a spring interposed between the button-mounting unit and the button for returning the button after being depressed, wherein the button-mounting unit comprises more than one hanger formed around an upper portion of the button-mounting unit for preventing the button-mounting unit from being separated before being fastened.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 4:
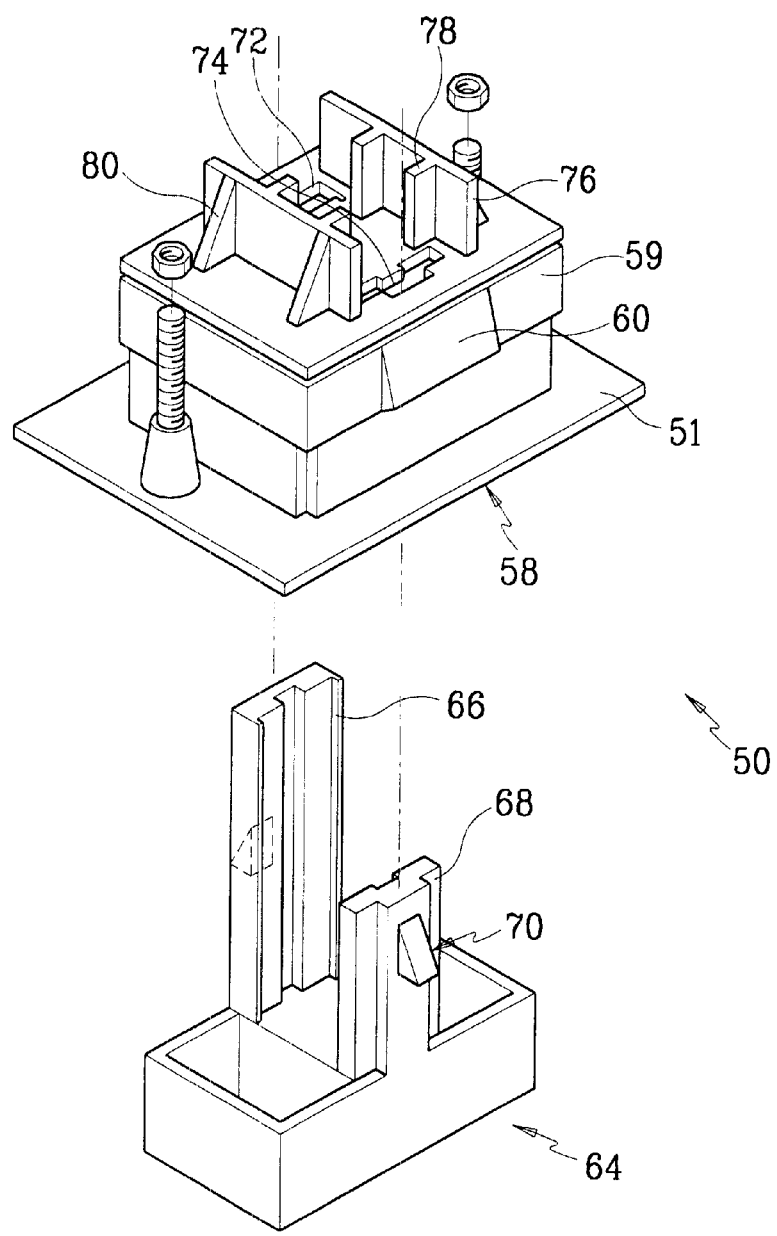
FIG. 4 is an exploded perspective view showing a tailgate glass release button assembly according to a preferred embodiment of the present invention.

FIG. 4 shows a tailgate glass release button assembly according to a preferred embodiment of the present invention.

Figure 5:
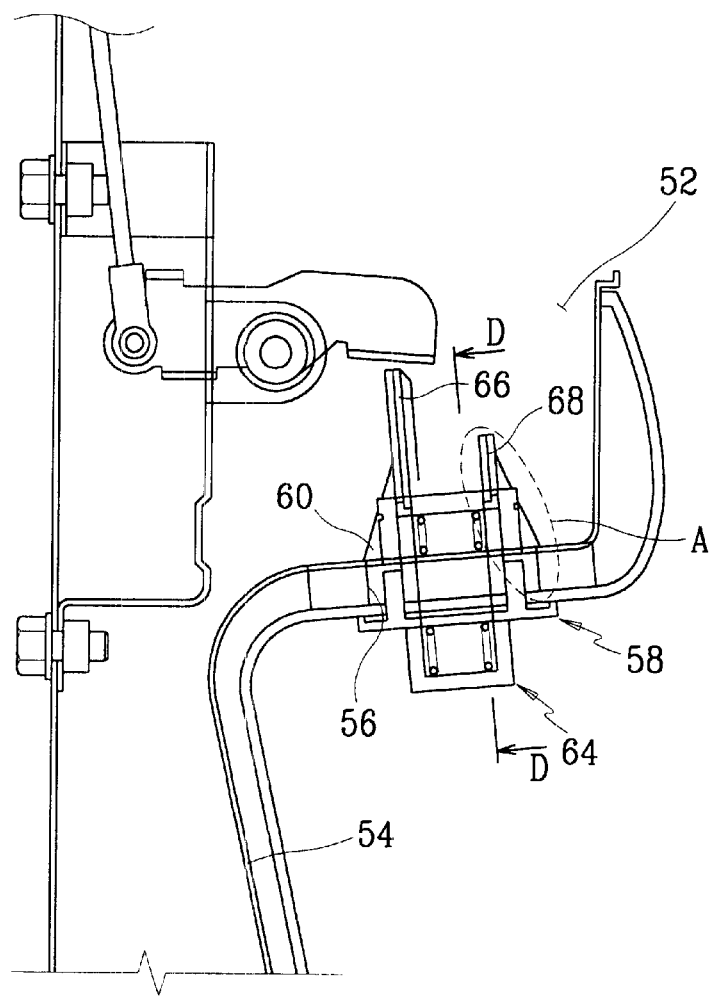
FIG. 5 is a side cross-sectional view showing the tailgate glass release button assembly of FIG. 4 installed in a tailgate.

The inventive tailgate glass release button assembly 50 comprises a button-mounting unit 58 and a button 64 plugged into a socket of the button-mounting unit 58. The tailgate glass release button assembly 50 is installed into a release button assembly hole 56 formed on an outer panel 54 of a tailgate 5 as shown in FIG. 5.

Figure 7:
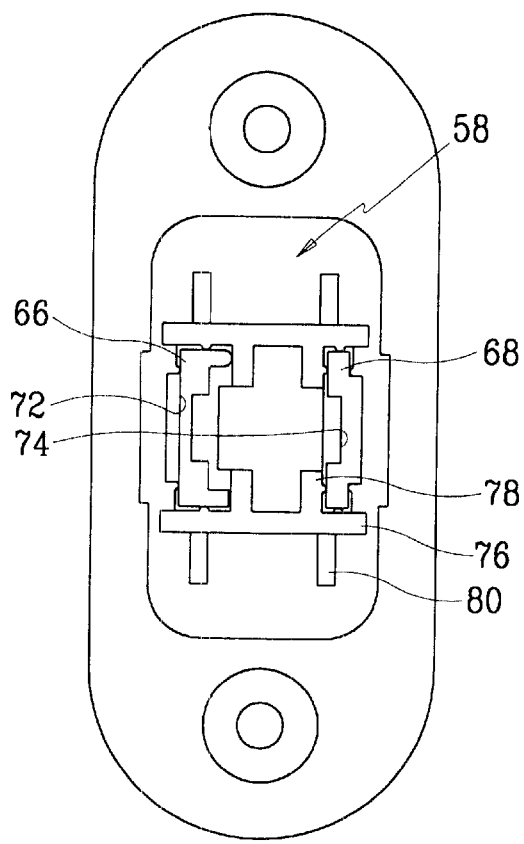
FIG. 7 is a top plane view of the release button assembly of FIG. 4.
Figure 8:
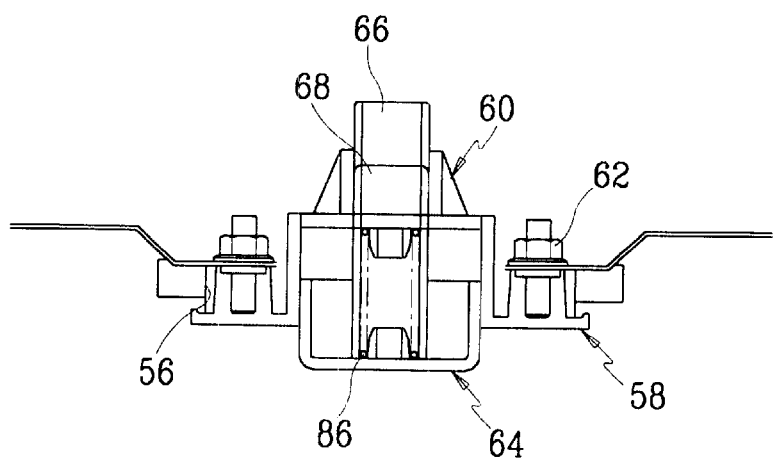
FIG. 8 is a cross sectional view taken along the line VIII—VIII of FIG. 5.

The button-mounting unit 58 has a shape of a box, a lower side of which is opened so as to receive the button 64, and it is provided with a flange 51 formed around the open side for providing fixation of the button-mounting unit 58 to the tailgate 52, a pre-assembly holder 59 formed around an upper end portion of the button-mounting unit 58, a pair of hangers 60 formed on two opposite sides of the pre-assembly holder 59, a pair of slots 72 and 74 formed in parallel on an upper side of the button-mounting unit 58, and a pair of parallel guide walls 76 perpendicularly formed in relation to the slots 72 and 74 on the upper side of the button-mounting unit 58, each guide wall 76 having a pair of perpendicular projections 78 formed on an inside surface thereof and being supported by a pair of supports 80 integrally formed on the outside surface of the guide projection (see FIGS. 7 and 8).

The button 64 is formed having the same shape as an inside of the socket of the button-mounting unit 58 so as to be inserted into the socket, and it is provided with a push rod 66 and a guide bar 68 extended upward from two opposite walls in middle portions of the walls, the push rod 66 and the guide bar 68 each having a stopper 70 upwardly formed on the outer surface thereof.

Figure 6:
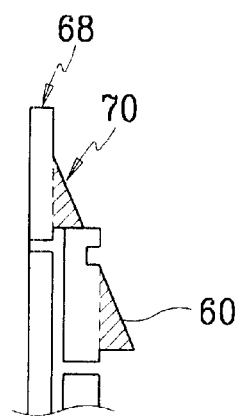
FIG. 6 is an enlarged view showing a portion A of FIG. 5.

As shown in FIG. 6, the stopper 70 has a surface tapered upwardly decreasing in order for the push rod 66 and the guide bar 68 to pass through the corresponding slots 72 and 74 of the button-mounting unit 58. Also the button is opened upward so that a coil spring 86 is installed therein when the button 64 is inserted into the socket of the button-mounting unit 58.

The button 64 is inserted into the socket of the button-mounting unit 58 in such a way that the push rod 66 and the guide bar 68 pass through the corresponding slots 72 and 74. Once the button 64 is inserted into the socket of the button-mounting unit 58 in the above way, the button 64 is prevented from separating out of the button-mounting unit 58 because of the stoppers 70 of the push rod 66 and the guide bar 68.

Figure 1:
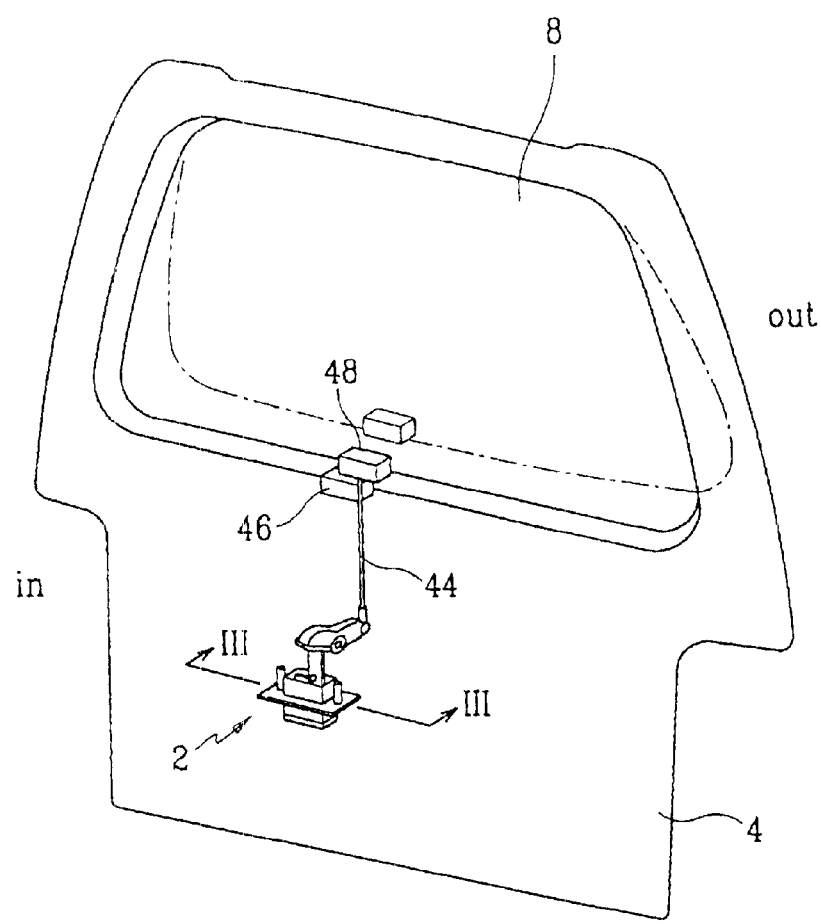
FIG. 1 is a schematic view showing a tailgate equipped with a conventional tailgate glass release button assembly.
Figure 2:
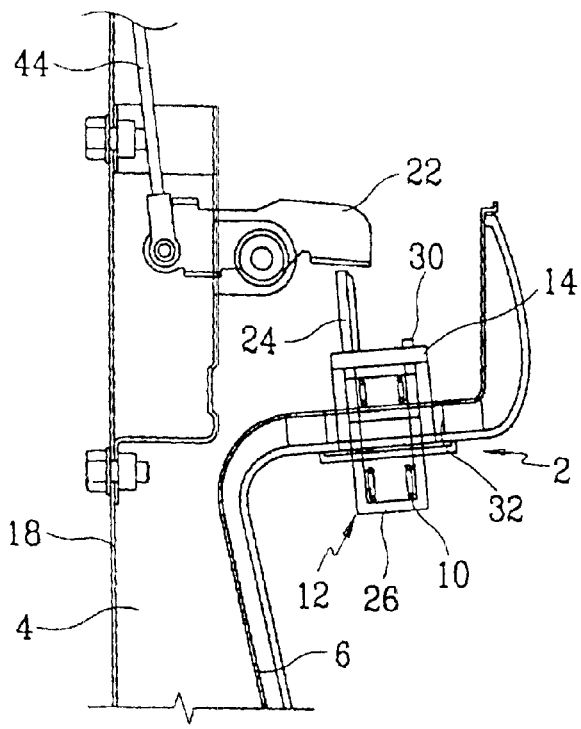
FIG. 2 is an enlarged side cross-sectional view of the conventional tailgate release button assembly of FIG. 1.
Figure 3:
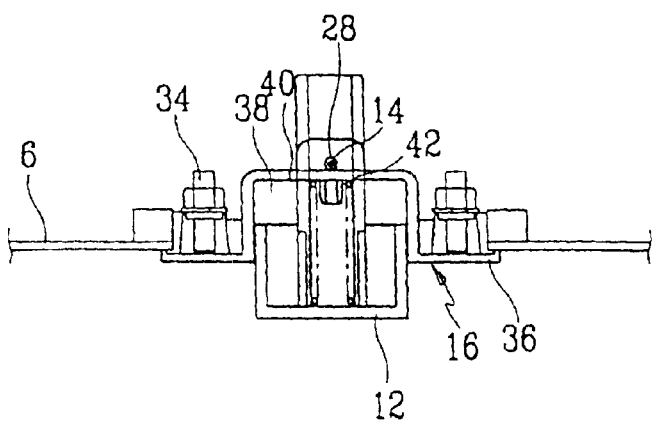
FIG. 3 is a cross sectional view cut along the line III—III of FIG. 1.

Once the button 64 is depressed, the push rod 66 and the guide bar 68 slide up along the guide walls 76 such that the push rod 66 pushes the opening lever and consequently the latch interactively connected to the opening lever via the link assembly is pulled down to release the tailgate glass (see FIG. 2).

The basic tailgate glass release mechanism of the present invention is the same as the conventional tailgate glass release assembly.

However, in the tailgate glass release button assembly according to the preferred embodiment of the present invention, since the push rod and the guide bar are guided by the guide walls and the guide projections when the button 64 depressed, the operation of the button is stable. Also, since the stoppers 70 are integrally formed with the button and act like the pin of the conventional tailgate release button assembly, the number of parts of the button assembly decreases. Furthermore, the tailgate glass release button is pre mounted by the hangers formed on the button-mounting unit such that the fastening work can be simply performed without holding the assembly.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A tailgate glass release button assembly comprising:

a button-mounting unit installed into a release button assembly hole formed on an outer panel of a tailgate for providing a socket;

a button plugged into the socket of the button-mounting unit; and a spring interposed between the button-mounting unit and the button for returning the button after being depressed;

wherein the button-mounting unit comprises more than one hanger formed around an upper portion of the button-mounting unit for preventing the button-mounting unit from being separated before being fastened, and the button has a push rod and a guide bar that are inserted into slots formed on an upper wall of the button-mounting unit, each having a stopper outside surface thereof for preventing the button from being released from the slots when the button returns.

2. A tailgate glass release button assembly of claim 1 wherein the button-mounting unit has a pair of guide walls formed on the outside surface of the upper wall of the button-mounting unit for guiding the push rod and the guide bar.

3. A tailgate glass release button assembly of claim 1 wherein the stopper has an upwardly decreasing surface for passing through the slots of the button-mounting unit.

* * * * *